US012126173B2

(12) United States Patent
Shijo (10) Patent No.: US 12,126,173 B2
(45) Date of Patent: Oct. 22, 2024

(54) INVERTER, POWER SOURCE DEVICE, ENERGY CONTROL METHOD, AND NON-TRANSITORY COMPUTER READABLE MEDIUM

(71) Applicant: KABUSHIKI KAISHA TOSHIBA, Tokyo (JP)

(72) Inventor: Tetsu Shijo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 36 days.

(21) Appl. No.: 17/683,010

(22) Filed: Feb. 28, 2022

(65) Prior Publication Data

US 2023/0079040 A1 Mar. 16, 2023

(30) Foreign Application Priority Data

Sep. 15, 2021 (JP) .................................. 2021-150573

(51) Int. Cl.
*H02J 3/24* (2006.01)
*H02J 3/38* (2006.01)

(52) U.S. Cl.
CPC ............... *H02J 3/24* (2013.01); *H02J 3/381* (2013.01); *H02J 2300/20* (2020.01)

(58) Field of Classification Search
CPC .......... H02J 3/24; H02J 3/381; H02J 2300/20; H02J 3/48; H02J 3/50; H02J 2300/24; Y02E 10/56
See application file for complete search history.

(56) References Cited

U.S. PATENT DOCUMENTS

| 10,381,832 B2 | 8/2019 | Sato et al. |
| 2008/0016328 A1* | 1/2008 | Taeshima ............... G06F 9/4403 712/220 |
| 2012/0089260 A1* | 4/2012 | Krohne ................... H02M 7/42 700/286 |

(Continued)

FOREIGN PATENT DOCUMENTS

| EP | 3 780 310 A1 | 2/2021 |
| JP | 2016-220352 A | 12/2016 |

(Continued)

OTHER PUBLICATIONS

Organization for Cross-regional Coordination of Transmission Operators, Japan (OCCTO), Examination of individual technical requirements "Provision of information on inertial force," presentation: 19 pages and translation: 1 page (Feb. 16, 2021).

(Continued)

*Primary Examiner* — Rexford N Barnie
*Assistant Examiner* — Thai H Tran
(74) *Attorney, Agent, or Firm* — Finnegan, Henderson, Farabow, Garrett & Dunner, LLP (57) ABSTRACT

An inverter of an embodiment includes a power convertor that can perform at least one of a first action of generating electricity to be output to a power system based on a pseudo inertia and a second action of generating electricity to be output to the power system without based on the pseudo inertia, and a transmitter that transmits, to a high-order control system, first information indicating which of the first action and the second action the power converter is performing.

20 Claims, 9 Drawing Sheets

(56) References Cited

U.S. PATENT DOCUMENTS

| | | | | |
|---|---|---|---|---|
| 2013/0018516 A1* | 1/2013 | Chee | ................ | H02J 13/00034 |
| | | | | 700/287 |
| 2015/0241893 A1* | 8/2015 | Hajimiragha | ............ | G05F 1/66 |
| | | | | 700/297 |
| 2016/0306372 A1* | 10/2016 | Holveck | ................ | G05F 1/625 |

FOREIGN PATENT DOCUMENTS

| | | | |
|---|---|---|---|
| JP | 2017-93290 A | | 5/2017 |
| JP | 2019-176584 A | | 10/2019 |
| JP | 2020188595 A | * | 11/2020 |

OTHER PUBLICATIONS

J.M. Guerrero et al., "Wireless-Control Strategy for Parallel Operation of Distributed-Generation Inverters," IEEE ISIE 2005, pp. 845-850 (2005).

Y. Noro, "Proposal of Inverter Control Method for Electric Power System Consisting of Energy Storages," IEEJ Trans. On Power and Energy, vol. 138, No. 11, pp. 854-861 (2018).

E. Ortjohann et al., "Grid-Forming Three-Phase Inverters for Unbalanced Loads in Hybrid Power Systems," 2006 IEEE $4^{th}$ World Conf. on Photovoltaic Energy, pp. 2396-2399 (2006).

J. Matevoysan et al., "Grid-Forming Inverters: Are They the Key for High Renewable Penetration?," IEEE Power and Energy Magazine, vol. 17, No. 6, pp. 89-98 (2019).

K. Sakimoto, "Research on virtual synchronous generator control applied to inverter-connected distributed power sources," Osaka Univ. Knowledge Archive (OUKA), DOI 10.18910/52161, 110 pages and translation: 63 pages (2015).

* cited by examiner

INVERTER, POWER SOURCE DEVICE, ENERGY CONTROL METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-150573, filed on Sep. 15, 2021, the entire contents of which are incorporated herein by reference.

FIELD

Embodiments described herein relate to an inverter, a power source device, an energy control method, and a non-transitory computer readable medium.

BACKGROUND

Unlike synchronous generators, power generation devices using natural energy such as solar power generators do not have a mechanism to convert rotation into electricity. As power generation performed by such power generation devices is not one that uses the inertia keeping a kinetic state, they do not have an inertia involved in power generation.

In recent years, the ratio of power generation using synchronous generators has decreased as solar power generation has become more mainstream. This raises a concern that a decrease in the inertia of an entire power system may make the power system unstable.

There are two control modes of inverters: one is called a grid following inverter in which the inverter behaves like a current source, and the other is called a grid forming inverter in which the inverter behaves like a voltage source. If a control method that simulates the operation of a synchronous generator is used in the grid following inverter or the grid forming inverter, virtual synchronous generator (VSG) control that mimics the inertia of a synchronous generator becomes possible. This allows an inverter that does not have an inertia as in solar power generation to behave as if it had an inertia, thereby contributing to stabilizing the power system.

Most of such inverters can easily switch between mimicking and not mimicking an inertia. Stably operating a power system requires a high-order control system that manages the power system to grasp information about mimicking of inertia by an inverter, including whether the inverter is mimicking inertia.

DETAILED DESCRIPTION

An inverter of an embodiment includes: a power converter configured to be able to perform at least one of a first action of generating a voltage to be output to a power system based on a pseudo inertia and a second action of generating a voltage to be output to the power system without based on the pseudo inertia; and a transmitter configured to transmit, to a high-order control system, first information indicating which of the first action and the second action the power converter is performing.

A power source device of an embodiment includes an inverter that includes: a power generator configured to convert renewable energy into electricity; a power converter configured to be able to perform at least one of a first action of generating electricity to be output to a power system based on a pseudo inertia by converting electricity generated by the power generator, and a second action of generating electricity to be output to the power system without based on the pseudo inertia by converting electricity generated by the power generator; and a transmitter configured to transmit, to a high-order control system, first information indicating which of the first action and the second action the power converter is performing.

An energy control method comprising: performing at least one of a first action of generating electricity to be output to a power system based on a pseudo inertial force and a second action of generating electricity to be output to the power system without based on the pseudo inertia, and transmitting to a high-order control system, first information indicating which of the first action and the second action is being performed.

A non-transitory computer readable medium having a computer program stored therein which when executed by a computer, causes the computer to perform processes comprising: performing at least one of a first action of generating electricity to be output to a power system based on a pseudo inertia and a second action of generating electricity to be output to the power system without based on the pseudo inertia; and transmitting, to a high-order control system, first information indicating which of the first action and the second action is being performed.

An embodiment of the present invention will be described below with reference to the drawings.

Figure 1:
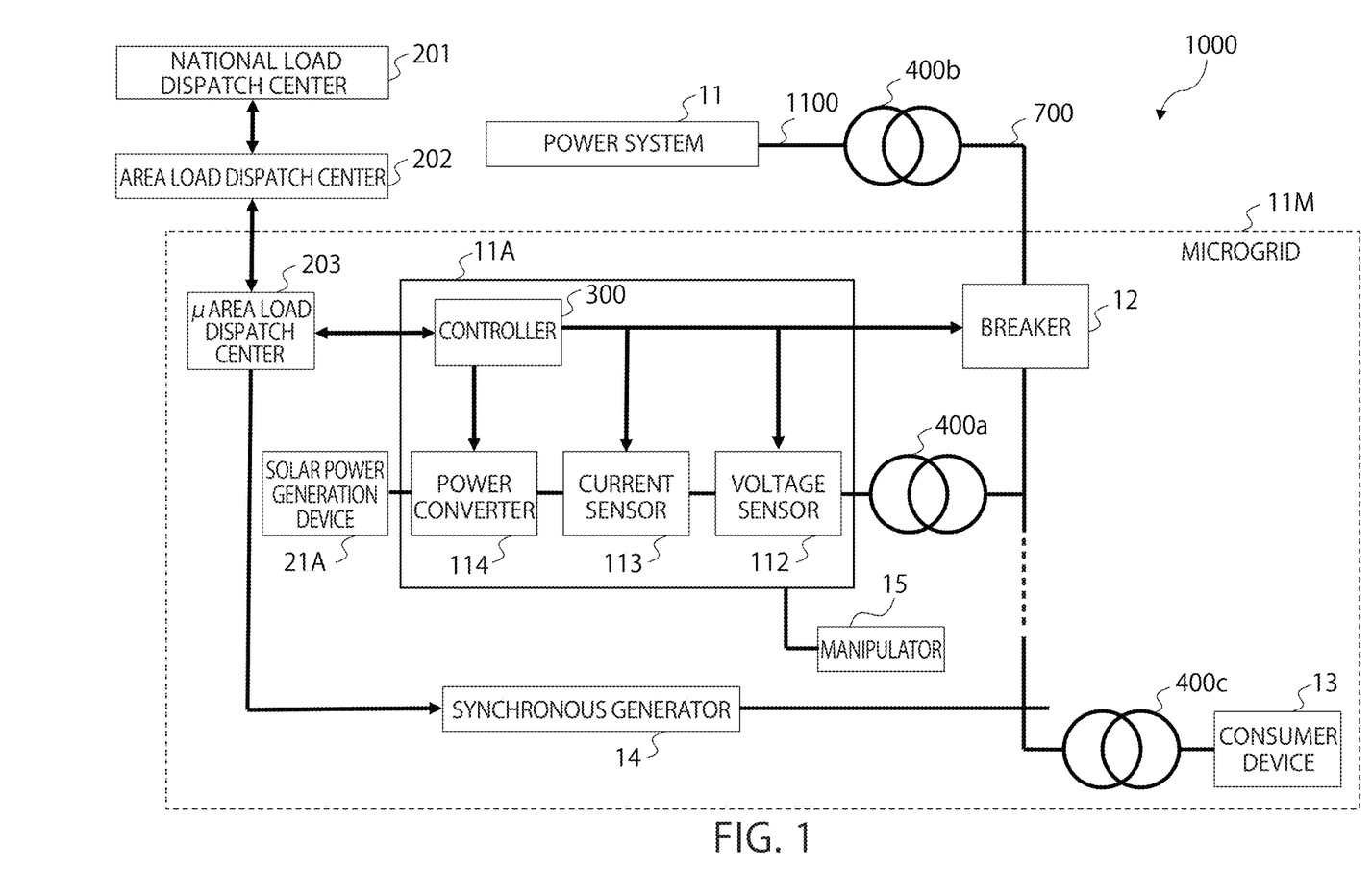
FIG. 1 is an overall configuration diagram of a power supply system according to an embodiment.

FIG. 1 indicates the overall configuration relating to a power supply system 1000 according to the embodiment of this disclosure.

A power system 11 is connected to an inverter 11A that is a power source device, a consumer device 13, and a synchronous power generation device 14 through a breaker 12. A solar power generation device 21A is connected to the inverter 11A.

Of the power system 11, a sub-system to which the inverter 11A, the consumer device 13, and the synchronous power generation device 14 are connected is a microgrid 11M. The microgrid 11M is a part of the power system 11.

The inverter 11A is an electronic device that generates and outputs electricity to be used in the consumer device 13 by converting direct-current power supplied from the solar power generation device 21A into direct-current power or alternating-current power. The inverter 11A is also called a power conversion device or a power conditioning system (PCS).

The inverter 11A functions as a grid forming inverter that controls the voltage of electricity supplied from the solar power generation device 21A and output to the power system 11. The inverter 11A functions also as a grid following inverter that controls the current of electricity supplied from the solar power generation device 21A and output to the power system 11. The inverter 11A can switch its own state to the grid forming inverter or the grid following inverter by a controller 300 to be described later.

The consumer device 13 is a load device that consumes electricity in a place such as a household, school, factory, or office, a power storage device that stores surplus electricity in the power system 11, or the like. While only one consumer device 13 is indicated in the drawings, a plurality of consumer devices 13 may be present.

The breaker 12 is an interrupter that interrupts power transmission from the inverter 11A to the power system 11. The breaker 12 is opened when an abnormality, such as an accident, occurs in the power system 11, during work, or in the event of an emergency, such as a fire. In the event of a power outage or when the breaker 12 is open, the microgrid 11M is electrically disconnected (cut off) from the power system 11 and therefore has no power supply. In this case, the microgrid 11M functions as a distributed power supply system capable of operating independently using renewable energy by a power generation device and a power storage device.

At normal times, for example, when the power system 11 has no abnormality, such as an accident, the breaker 12 is closed. When the breaker 12 is in a closed state, electricity is supplied to the power system 11 through the inverter 11A connected to the solar power generation device 21A. The supplied electricity is supplied to the consumer device 13. When an abnormality, such as an accident, occurs in the power system 11, the breaker 12 is opened, so that the inverter 11A is in a state of being connected to the microgrid 11M cut off from the power system 11.

The synchronous power generation device 14 is an alternating-current generator that generates alternating-current power and provides it to the power system 11 or the microgrid 11M. The synchronous power generation device 14 includes an emergency generator or a regular generator, or both of them. One example of emergency generators is an emergency diesel generator. The emergency diesel generator does not operate at normal times, and starts operating on order from a worker when an abnormality or the like occurs in the power system 11 and the microgrid 11M is cut off from the power system 11.

An order from a worker may be given by a switch, such as a button, provided in the synchronous power generation device 14. Alternatively, an order from a worker may be given as an order signal is transmitted wirelessly or via wire from a terminal that a worker can use or from a terminal that a monitor at a control center can use. Examples of terminals that a worker can operate include a tablet terminal for maintenance use. Example of terminals that a monitor can operate include a server that monitors the microgrid 11M online or offline.

A configuration not provided with the synchronous power generation device 14 is also possible. When synchronous generators are used as emergency and regular devices, they are sometimes used with governors thereof switched between isochronous characteristics and droop characteristics. In the case of isochronous characteristics, the generator is controlled such that the rotation speed remains constant regardless of the load connected thereto. In the case of droop characteristics, the rotation speed of the generator changes according to the magnitude of the load connected thereto, and the load is shared with other synchronous generators for load fluctuations or the like. In some cases, the generators are used with the governors switched to droop characteristics when in normal operation with the microgrid interconnected to the power system, and to isochronous characteristics when used off-grid in an emergency or the like.

The microgrid 11M receives a control command from a high-order control system 200, and performs power control of the power system and the microgrid 11M based on the control command from the high-order control system 200. That is, power control of the power system and the microgrid 11M is performed by remote operation. Specific examples of the control command include a frequency command value, an active power command value, a voltage command value, and a reactive power command value. The control command can include all or some of these command values.

The high-order control system 200 has a hierarchical structure with multiple levels, and includes, for example, a National Load Dispatch Center 201 (central command system), an Area Load Dispatch Center 202 (second energy management system), and a μArea Load Dispatch Center 203 (first energy management system). The National Load Dispatch Center 201 (central command system) is the highest-order control system. The Area Load Dispatch Center 202 (second energy management system) receives a command from the National Load Dispatch Center 201 and controls the μArea Load Dispatch Center 203 (issues a command to the μArea Load Dispatch Center 203). The μArea Load Dispatch Center 203 receives a command from the Area Load Dispatch Center 202 and controls the inverter 11A.

When the power system 11 is in normal operation, electricity is transmitted thereto from the power system 11 via a transmission network 1100. The transmitted electricity is supplied to the microgrid 11M via a distribution network 700 after the voltage is converted through a transformer 400b.

The inverter 11A is connected to the microgrid 11M through a transformer 400a. The inverter 11A includes the controller 300, measurement devices, including a voltage sensor 112 and a current sensor 113, and a power converter 114. The controller 300 is connected to the voltage sensor 112, the current sensor 113, and the power converter 114. The voltage sensor 112 detects a voltage of the microgrid 11M (a voltage at an output end of the inverter) and outputs information indicating the detected voltage to the controller 300. The current sensor 113 detects a current of the microgrid 11M (a current at the output end of the inverter) and outputs information indicating the detected current to the controller 300.

The power converter 114 is a DC-DC converter and a DC-AC inverter. Thus, the power converter 114 has a function of changing a direct current from the solar power generation device 21A into an alternating current, as well as a function of outputting the converted alternating-current power to the microgrid 11M or the power system 11.

The power converter 114 can perform an inertial action (first action) of giving a pseudo inertia to an output to the power system 11, or a non-inertial action (second action) of not giving a pseudo inertia thereto.

For example, when the action of the inverter 11A is the inertial action of giving a pseudo inertia in a state of the grid forming inverter, the inverter 11A normally converts an output from the solar power generation device 21A into a voltage that has been monitored by the voltage sensor 112 and is suitable for the power system 11. However, when a change, such as an increase in power demand for the power system 11, occurs, the inverter 11A automatically changes the output voltage by outputting active power and reactive power. By thus making a response so as to reduce fluctuations in frequency or the like of the power system 11, the inverter 11A stabilizes the power system 11.

Switching to either of the above actions can be performed by the controller 300 to be described later.

The power converter 114 may be configured to be able to output, under control by the controller 300, reactive power or active power, or both reactive power and active power to the controller 300 as a signal for detecting independent operation of its own device.

Electricity converted by the power converter 114 is output to the consumer device 13 etc. after the voltage is converted to an appropriate voltage by the transformer 400a. The electricity output to the consumer device 13 is supplied to the consumer device 13 after the voltage is converted to an appropriate voltage by a transformer 400c. In the case where reverse power flow is tolerated, output electricity may be transmitted to the power system 11 through the distribution network 700, the transformer 400b, and the transmission network 1100.

Figure 2:
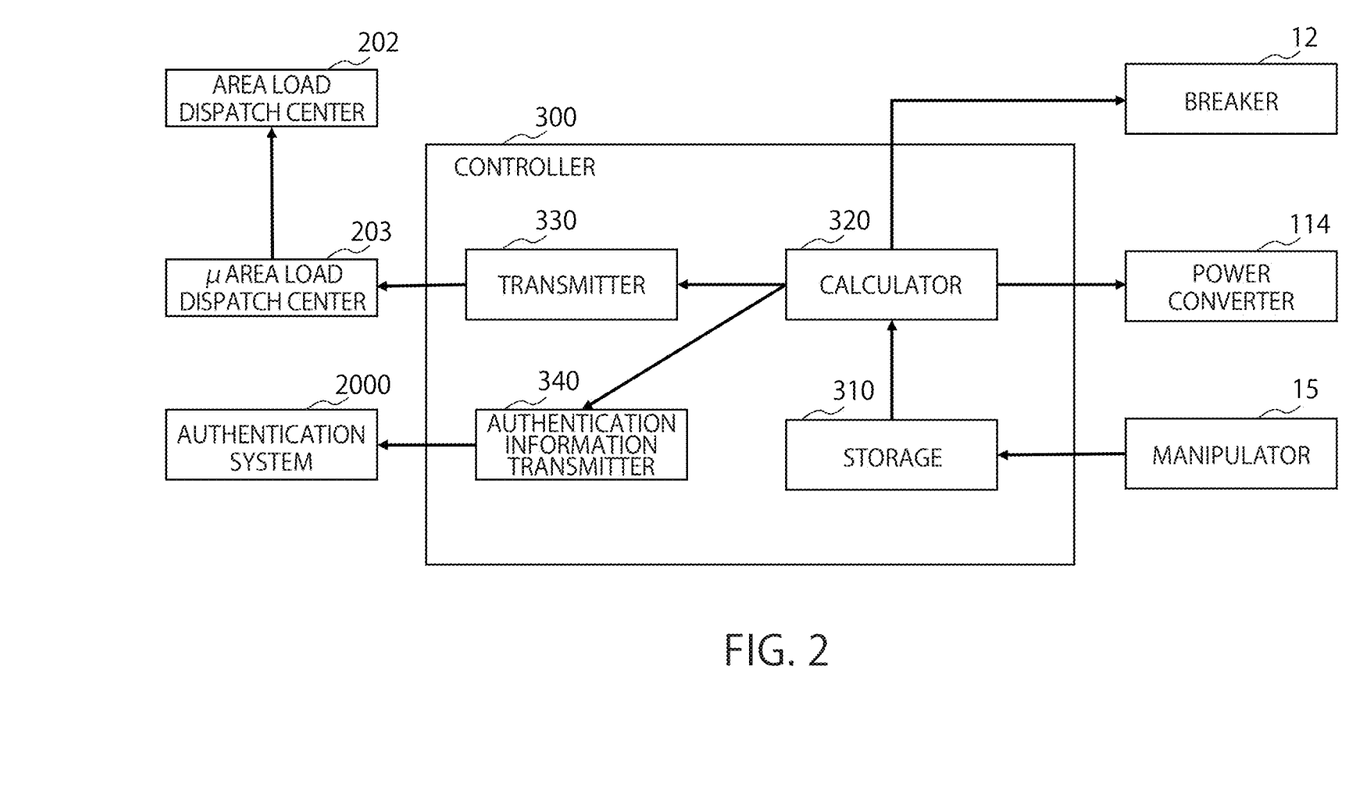
FIG. 2 is a block diagram of a controller according to the embodiment.

FIG. 2 indicates a configuration relating to the controller 300 according to the embodiment of this disclosure.

The controller 300 receives a control command from the µArea Load Dispatch Center 203, and executes the received control command to control the inverter 11A and the breaker 12. The controller 300 functions also as a receiver that receives a control command. The controller 300 functions also as a transmitter that transmits authentication information to an authentication system 2000.

The controller 300 includes a storage 310, a calculator 320, a transmitter 330, and an authentication information transmitter 340.

The storage 310 is a semiconductor that stores actions and states of the inverter 11A.

The storage 310 stores one of the following combinations the inverter 11A operates: the grid forming inverter and the inertial action of giving a pseudo inertia to the power system 11 or the grid forming inverter and the non-inertial action of not giving a pseudo inertia and the grid following inverter and the former action or the grid following inverter and the latter action. For example, the storage 310 stores a combination in which the inverter 11A is the grid forming inverter and operates based on the inertial action relatively to the power system 11. In this embodiment, contents stored in the storage 310 are stored as information on firmware of the inverter 11A. The storage 310 transmits the stored actions and states of the inverter 11A to the calculator 320.

The contents of the firmware in the storage 310 can be rewritten by a manipulator 15 that is connected to the controller 300.

The manipulator 15 is a terminal which is incorporated in the inverter 11A and by which a worker inputs an order. The manipulator 15 may instead be a terminal that a worker can operate or a terminal that a monitor at the control center can operate.

At the time of startup of the inverter 11A, the manipulator 15 allows one to select the action and state of the inverter 11A and rewrite the contents of the firmware to thereby rewrite the information in the storage 310.

The calculator 320 performs calculations to execute a control command received from the µArea Load Dispatch Center 203 and transmits the calculation result to control the inverter 11A.

For example, the calculator 320 calculates the action and state of the power converter 114 based on the information stored in the storage 310. The calculator 320 opens and closes the breaker 12 based on a command from the high-order control system. The calculator 320 transmits information to the transmitter 330 and the authentication information transmitter 340. Other than the information in the storage 310, the calculator 320 transmits information on calculation results to the transmitter 330 and the authentication information transmitter 340. For example, the calculator 320 transmits pieces of information, including an inertia constant that is information for quantitatively grasping an inertia based on the inertial action of the grid forming inverter.

The calculator 320 is connected to the breaker 12 and controls opening and closing of the breaker 12 based on calculation results. Thus, interruption of power transmission to the power system 11 can be controlled regardless of operation of the power converter 114.

The transmitter 330 transmits the action (first information) and state (second information) of the inverter 11A to the high-order control system. The transmitter 330 is communicably connected to the µArea Load Dispatch Center 203 that is one of the high-order control systems via a communication network. The communication network may be a wireless communication network, such as a wireless LAN, a mobile network, or Bluetooth, or a wired communication network, such as a dedicated line, Ethernet, or a serial communication cable.

The µArea Load Dispatch Center 203 transmits the action and state of the inverter 11A to the Area Load Dispatch Center 202 that is a higher-order control system. Similarly, the Area Load Dispatch Center 202 transmits the transmitted information to the National Load Dispatch Center 201 that is an even-higher-order control system.

The transmitter 330 may directly transmit the National Load Dispatch Center 201 without involving the µArea Load Dispatch Center 203 and the Area Load Dispatch Center 202.

In any case, the action and state of the inverter 11A are finally transmitted to the National Load Dispatch Center 201 that is the highest-order control system. The National Load Dispatch Center 201 can grasp whether the inverter 11A operates based on the inertial action.

The transmitter 330 may transmit the action and state of the inverter 11A to the µArea Load Dispatch Center 203 in specified cycles, for example, once every minute or once every hour. When a state transmission request is received from the µArea Load Dispatch Center 203, the transmitter 330 may transmit the action and state of the inverter 11A based on this request.

The transmitter 330 may transmit information other than the action and state of the inverter 11A to be transmitted. For example, the transmitter 330 may transmit information indicating that the breaker 12 of the power supply system 1000 is open. For example, when the breaker 12 is open and the inverter 11A and the power system 11 are cut off from each other, the inverter 11A cannot output electricity to the power system 11 even when it is operating based on the inertial action. In this case, even when the inverter 11A is performing the inertial action, the transmitter 330 may transmit, to the high-order control system, information indicating that the inverter 11A cannot output electricity to the power system 11 based on a pseudo inertia.

For example, the transmitter 330 may transmit inertia information, such as an inertia constant, for the power converter 114 to quantitatively grasp the inertia mimicked by the inertial action.

The authentication information transmitter 340 transmits, to the authentication system 2000, authentication information that demands confirmation of whether information on the inverter 11A that the transmitter 330 has transmitted to the high-order control system is true or false.

Whether or not to provide an inertia mimicked by the inverter 11A based on the operation of the power converter 114 can be changed by changing the contents of the firmware.

To actually measure an inertia mimicked by the inverter 11A, a sampling cycle of, for example, 100 ms or shorter is required. Thus, it is not easy to constantly monitor the inertia mimicked by the inverter 11A by means of a smart meter installed in the microgrid 11M or the power system 11. It is possible to pretend to the high-order control system that the inverter 11A is mimicking an inertia by, for example, cheating on the sampling cycle, when in reality it is not providing an inertia to the power system 11.

The power system 11 becomes unstable when a difference occurs between the inertia of the power system 11 that is grasped by the National Load Dispatch Center 201 and the actual inertia of the power system 11.

In the case where the National Load Dispatch Center 201 offers an incentive for inverters that provide an inertia that contributes to stabilizing the power system 11, an inverter that pretends to provide an inertia is allowed a free ride.

The authentication information transmitter 340 of the controller 300 is communicably connected to the authentication system 2000. The authentication information transmitter 340 transmits, to the authentication system 2000, authentication information that demands confirmation of whether information indicating which of the inertial action and the non-inertial action is being performed based on the operation of the power converter 114 is true or false.

The authentication system 2000 may perform authentication based on a blockchain from the authentication information and transmit the authentication result in the form of authentication information as a reply. Thus, it is confirmed whether the information about the operation of the power converter 114 transmitted by the authentication information transmitter 340 is true or false.

The authentication information may be, for example, a sequence of numbers created from the state of the inverter, a plain text that directly describes the state of the inverter, or a check digit.

Through such authentication, it is confirmed that the inverter has contributed to the power system 11. An incentive is paid for the inverter 11A of which authenticity has been confirmed by the authentication system 2000.

Figure 3:
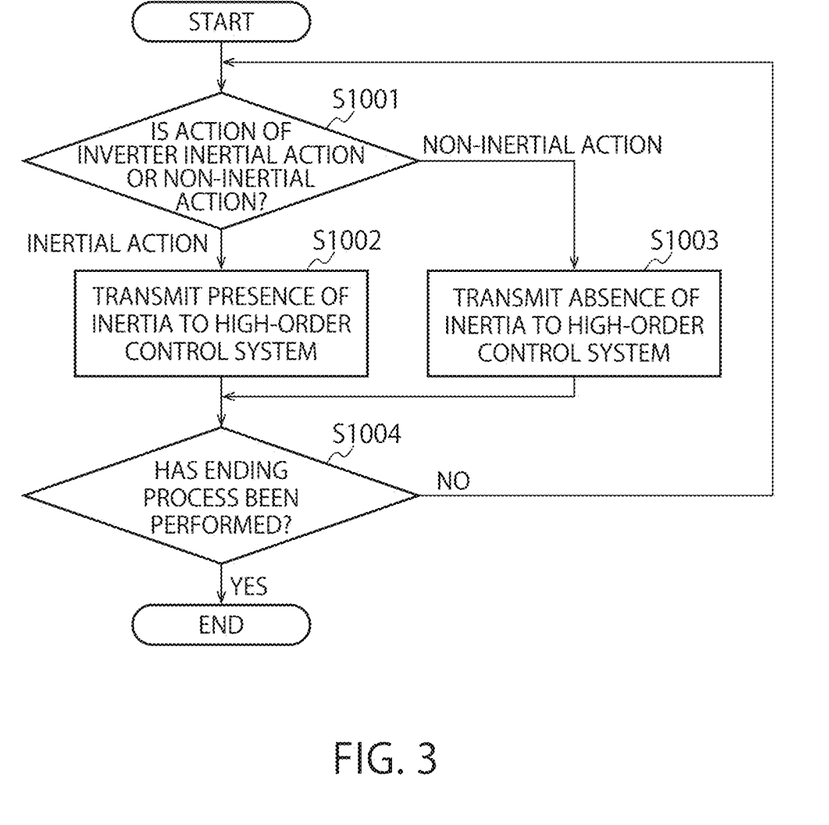
FIG. 3 is a flowchart schematically indicating an example of an action in which an inverter according to the embodiment periodically transmits presence or absence of an inertia to a high-order control system.

FIG. 3 is a flowchart schematically indicating an example of an action in which the inverter 11A according to the embodiment periodically transmits its state to the high-order control system.

First, the calculator 320 of the controller 300 of the inverter 11A determines whether the action of the inverter 11A is the inertial action or the non-inertial action (S1001). In the case of the inertial action, the process flow moves to S1002, and in the case of the non-inertial action, the process flow moves to S1003.

In the case of the inertial action, the calculator 320 transmits, to the transmitter 330, information indicating that the action of the inverter 11A is the inertial action. The transmitter 330 transmits the high-order control system that the inverter 11A outputs electricity to the power system 11 based on a pseudo inertia (S1002). In the case of the non-inertial action, the calculator 320 transmits, to the transmitter 330, information indicating that the action of the inverter is the non-inertial action. The transmitter 330 transmits the high-order control system that the inverter 11A does not output electricity to the power system 11 based on a pseudo inertia (S1003).

Next, the calculator 320 determines whether an ending process has been performed on the inverter 11A (S1004). When the ending process has been performed, the current process ends, and when not, the process flow returns to S1001. Thus, the inverter 11A periodically transmits the state of the inverter to the high-order control system until the ending process is performed.

Figure 4:
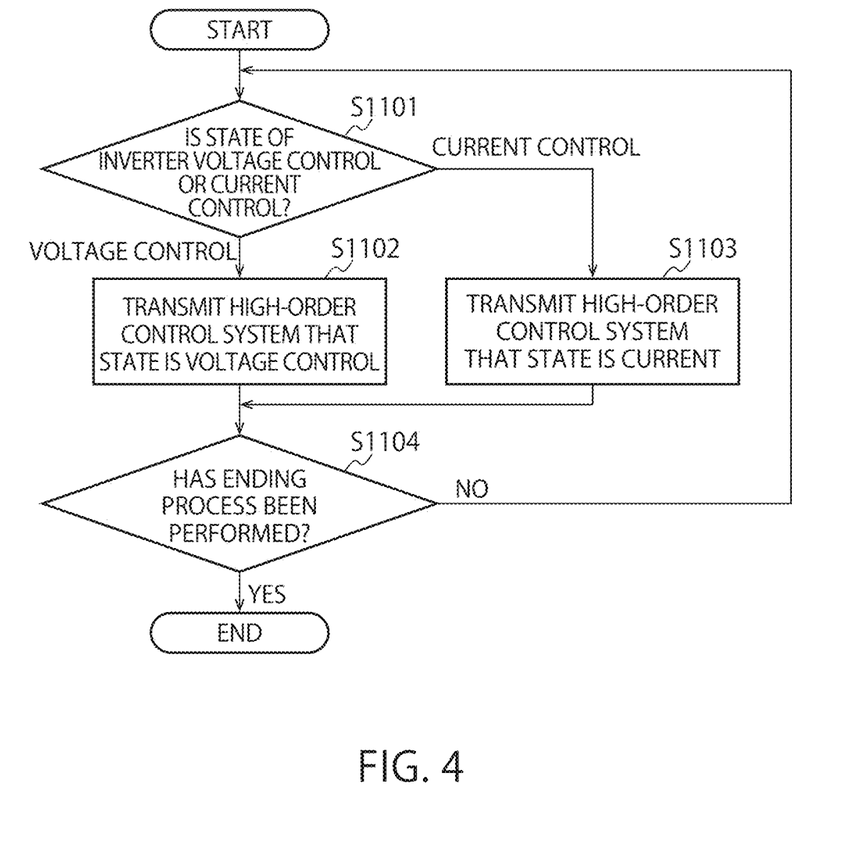
FIG. 4 is a flowchart schematically indicating an example of an action in which the inverter according to the embodiment transmits a state of the inverter to the high-order control system.

FIG. 4 is a flowchart schematically indicating an example of an action in which the inverter 11A according to the embodiment transmits the state of the inverter to the high-order control system.

First, the calculator 320 of the controller 300 of the inverter 11A determines whether the state of the inverter 11A is the grid forming inverter or the grid following inverter (S1101). In the case of the grid forming inverter, the process flow moves to S1102, and in the case of the grid following inverter, the process flow moves to S1103.

In the case of the grid forming inverter, the calculator 320 transmits, to the transmitter 330, information indicating that the state of the inverter is the grid forming inverter. The transmitter 330 transmits the high-order control system that the state of the inverter 11A is the grid forming inverter (S1102). In the case of the grid following inverter, the calculator 320 transmits, to the transmitter 330, information indicating that the state of the inverter is the grid following inverter. The transmitter 330 transmits the high-order control system that the state of the inverter 11A is the grid following inverter (S1103).

Next, the calculator 320 determines whether an ending process has been performed on the inverter 11A (S1104). When the ending process has been performed, the current process ends, and when not, the process flow returns to S1101. Thus, the inverter 11A periodically transmits the state of the inverter to the high-order control system until the ending process is performed.

Figure 5:
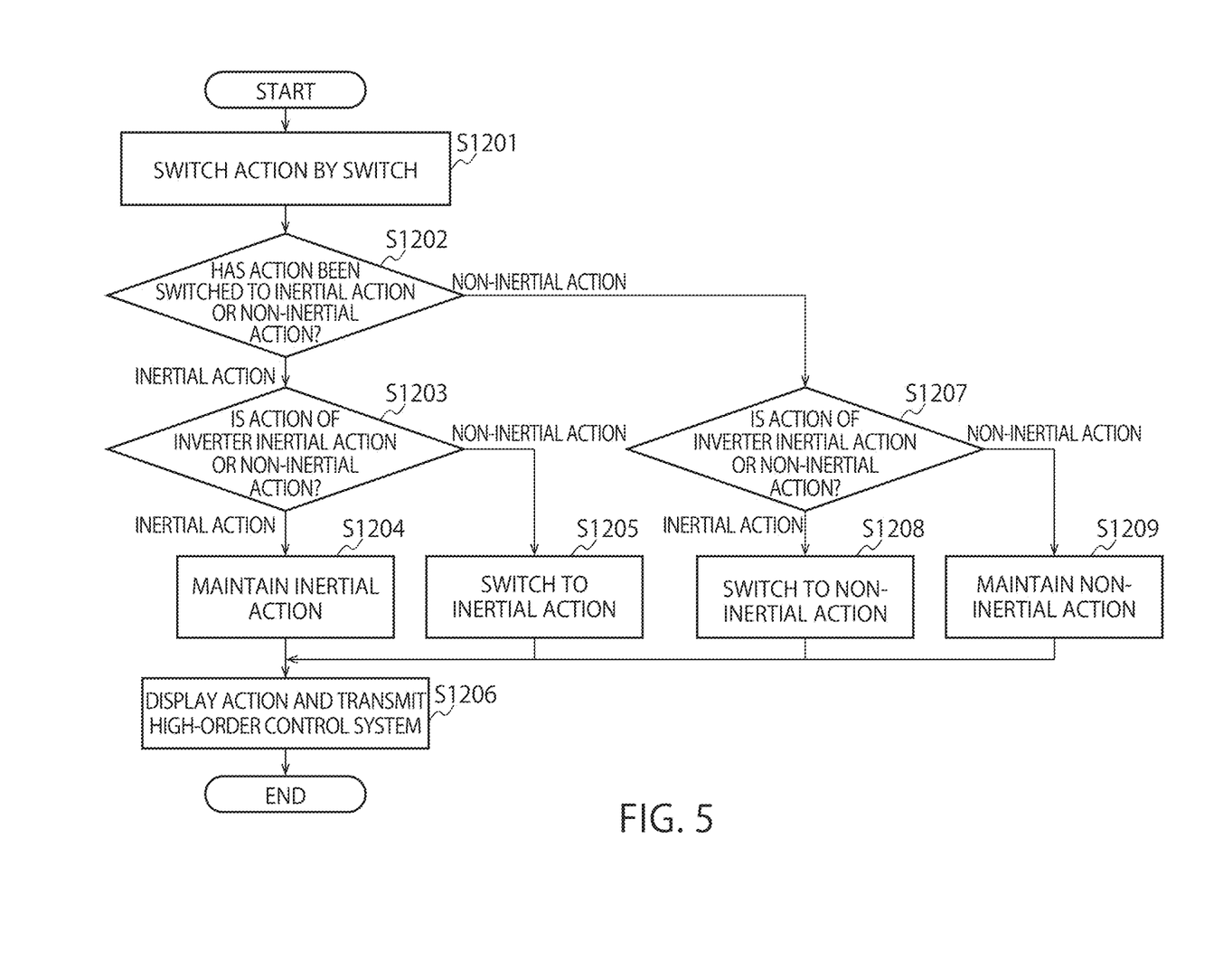
FIG. 5 is a flowchart schematically indicating an example of an action in which an action of the inverter according to the embodiment is switched by a switch.

FIG. 5 is a flowchart schematically indicating an example of an action in which the action of the inverter 11A according to the embodiment is switched by the manipulator 15.

First, the action of the inverter 11A is switched by the manipulator 15 that is the switch of the inverter 11A (S1201). The calculator 320 of the controller 300 determines whether the manipulator 15 has switched the action of the inverter 11A to the inertial action or the non-inertial action (S1202). When the action has been switched to the inertial action, the process flow moves to S1203, and when the action has been switched to the non-inertial action, the process flow moves to S1206.

Next, a case where the action has been switched to the inertial action will be described. The calculator 320 of the inverter 11A determines whether the action of the inverter 11A is the inertial action or the non-inertial action (S1203). In the case of the inertial action, the process flow moves to S1204, and in the case of the non-inertial action, the process flow moves to S1205.

In the case of the inertial action, the calculator 320 need not switch the action of the inverter and therefore maintains the action as it is (S1204). In the case of the non-inertial action, the calculator 320 confirms that the contents of the firmware in the storage 310 have been rewritten from the non-inertial action to the inertial action, and switches the inverter 11A to the inertial action (S1205).

The controller 300 displays the current action of the inverter 11A. Next, the transmitter 330 transmits the action of the inverter 11A to the high-order control system (S1206).

Also when the action has been switched to the non-inertial action, the calculator 320 of the controller 300 of the inverter 11A determines whether the action of the inverter 11A is the inertial action or the non-inertial action (S1207). In the case of the inertial action, the process flow moves to S1208, and in the case of the non-inertial action, the process flow moves to S1209.

In the case of the inertial action, the calculator 320 confirms that the contents of the firmware in the storage 310 have been rewritten from the inertial action to the non-inertial action, and switches the inverter 11A to the non-inertial action (S1208). In the case of the non-inertial action, the calculator 320 need not switch the action of the inverter and therefore maintains the action as it is (S1209).

Figure 6:
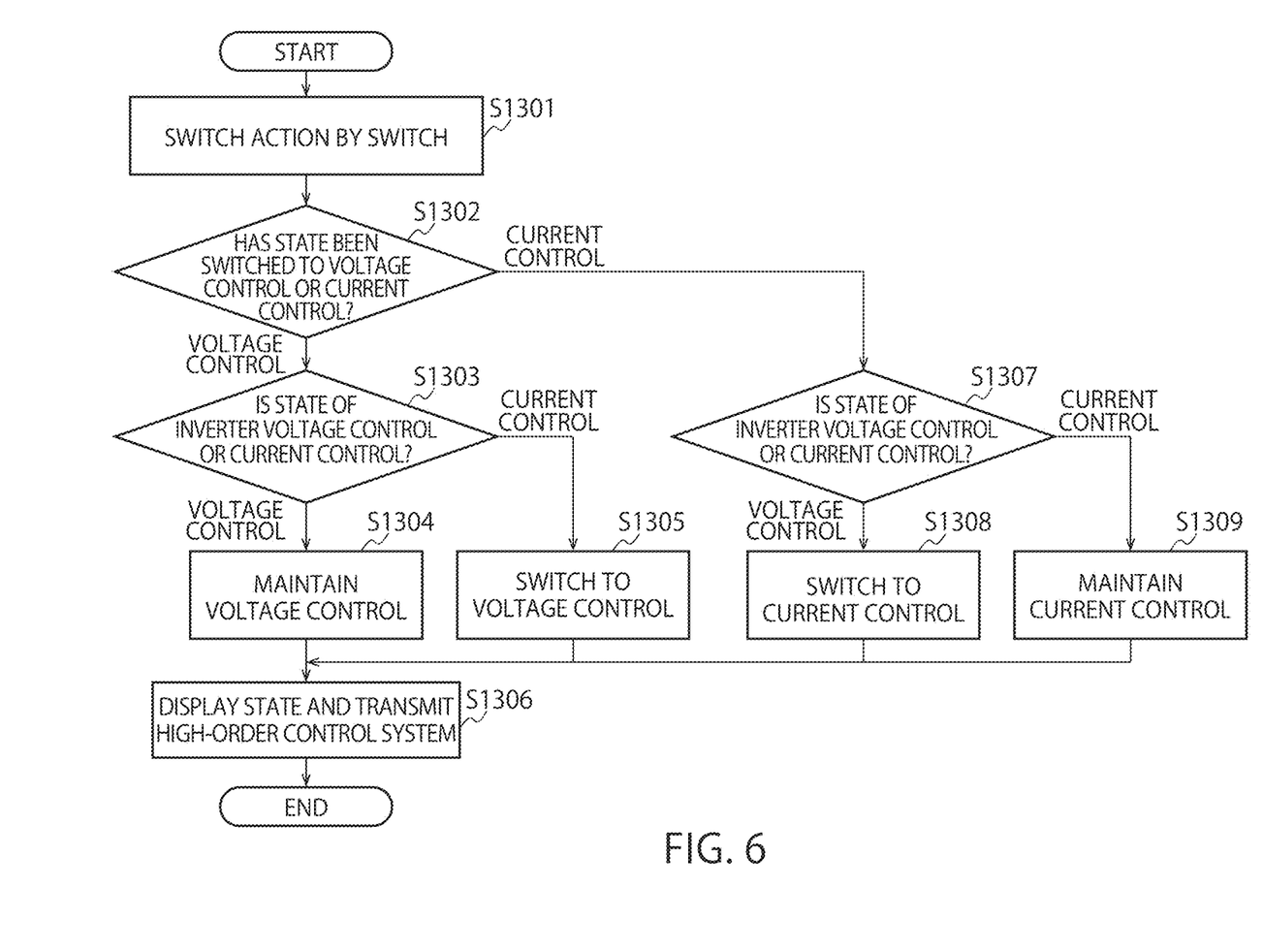
FIG. 6 is a flowchart schematically indicating an example of an action in which a state of the inverter according to the embodiment is switched by the switch.

FIG. 6 is a flowchart schematically indicating an example of an action in which the state of the inverter 11A according to the embodiment is switched by the manipulator 15.

First, the state of the inverter 11A is switched by the manipulator 15 that is the switch of the inverter 11A (S1301). The calculator 320 of the controller 300 determines whether the manipulator 15 has switched the state of the inverter to the grid forming inverter or the grid following inverter (S1302). When the state has been switched to the grid forming inverter, the process flow moves to S1303, and when the state has been switched to the grid following inverter, the process flow moves to S1307.

Next, a case where the state has been switched to the grid forming inverter will be described. The calculator 320 of the controller 300 of the inverter 11A determines whether the state of the inverter 11A is the grid forming inverter or the grid following inverter (S1303). In the case of the grid forming inverter, the process flow moves to S1304, and in the case of the grid following inverter, the process flow moves to S1305.

In the case of the grid forming inverter, the calculator 320 need not switch the state of the inverter and therefore maintains the state as it is (S1304). In the case of the grid following inverter, the calculator 320 confirms that the contents of the firmware in the storage 310 have been rewritten from the grid following inverter to the grid forming inverter, and switches the inverter 11A to the grid forming inverter (S1305). When the state is to be switched from the grid following inverter to the grid forming inverter, synchronizing power may arise, and a current exceeding a rated current may flow to the inverter; therefore, synchronous connection may be performed in which the inverter is connected to the power system after all or some of the amplitudes, frequencies, and phases of the system voltage and the inverter output voltage are matched.

The controller 300 displays the current state of the inverter 11A. Next, the transmitter 330 transmits the state of the inverter 11A to the high-order control system (S1306).

Also when the state has been switched to the grid following inverter, the calculator 320 of the controller 300 of the inverter 11A determines whether the state of the inverter 11A is the grid forming inverter or the grid following inverter (S1307). In the case of the grid forming inverter, the process flow moves to S1308, and in the case of the grid following inverter, the process flow moves to S1309.

In the case of the grid forming inverter, the calculator 320 confirms that the contents of the firmware in the storage 310 have been rewritten from the grid forming inverter to the grid following inverter, and switches the inverter 11A to the grid following inverter (S1308). In the case of the grid following inverter, the calculator 320 need not switch the state of the inverter and therefore maintains the state as it is (S1309).

Figure 7:
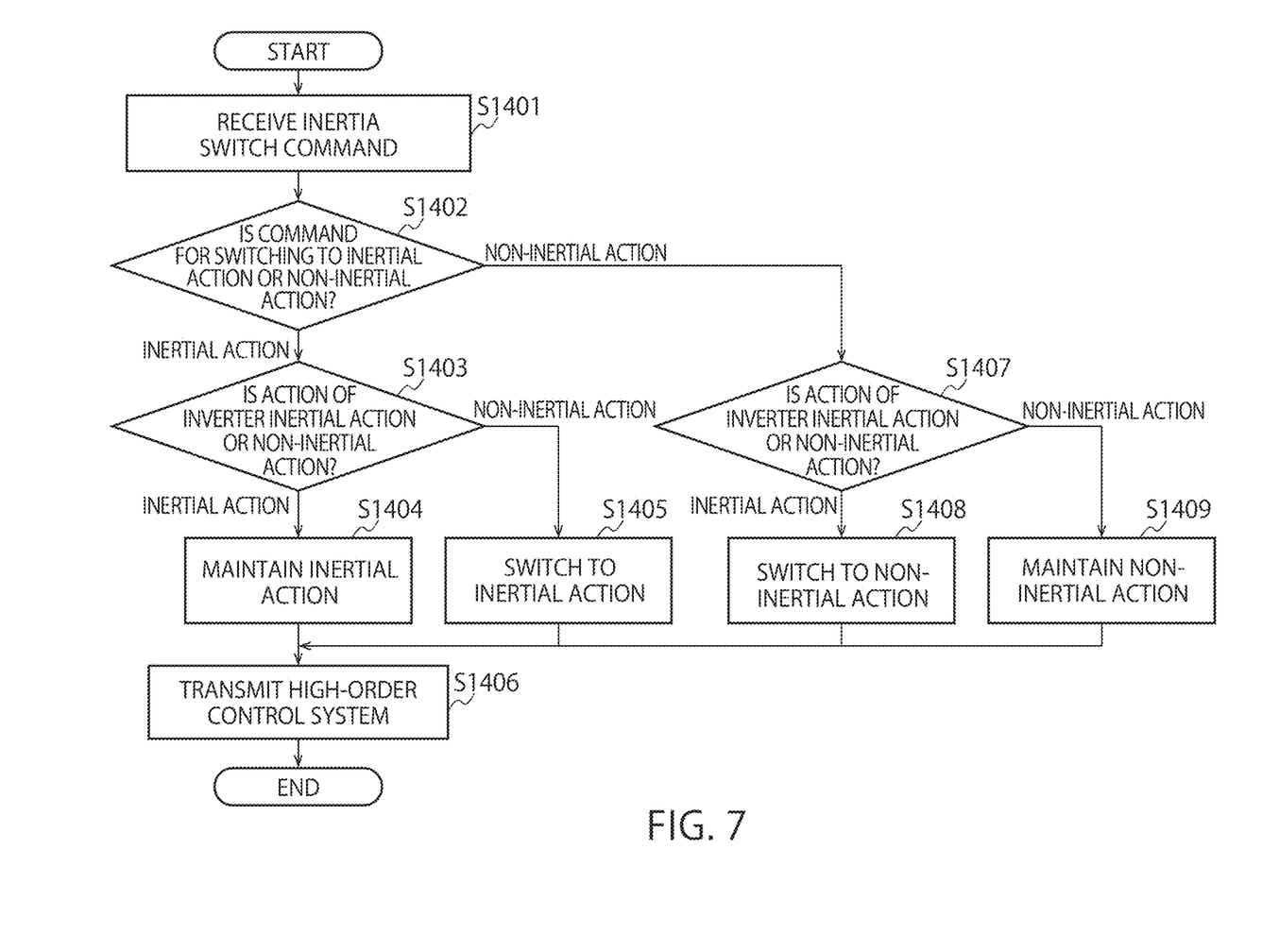
FIG. 7 is a flowchart schematically indicating an example of an action in which the inverter according to the embodiment switches its action on command from the high-order control system.

FIG. 7 is a flowchart schematically indicating an example of an action in which the inverter 11A according to the embodiment switches its action on command from the high-order control system.

First, the controller 300 receives an inertia switch command for switching the action of the inverter 11A from the high-order control system (S1401). The calculator 320 of the controller 300 determines whether the inertia switch command is a command for switching to the inertial action or a command for switching to the non-inertial action (S1402). In the case of the inertial action, the process flow moves to S1403, and in the case of the non-inertial action, the process flow moves to S1407.

Next, a case where the inertia switch command for switching to the inertial action has been received will be described. The calculator 320 of the inverter 11A determines whether the action of the inverter 11A is the inertial action or the non-inertial action (S1403). In the case of the inertial action, the process flow moves to S1404, and in the case of the non-inertial action, the process flow moves to S1405.

In the case of the inertial action, the calculator 320 need not switch the action of the inverter and therefore maintains the action as it is (S1404). In the case of the non-inertial action, the calculator 320 rewrites the contents of the firmware in the storage 310 from the non-inertial action to the inertial action and switches the action of the inverter 11A to a first state (S1405).

Next, the transmitter 330 transmits the action of the inverter 11A to the high-order control system (S1406).

Next, a case where the inertia switch command for switching to the non-inertial action has been received will be described. The calculator 320 of the inverter 11A determines whether the action of the inverter 11A is the inertial action or the non-inertial action (S1407). In the case of the inertial action, the process flow moves to S1408, and in the case of the non-inertial action, the process flow moves to S1409.

In the case of the inertial action, the calculator 320 rewrites the contents of the firmware in the storage 310 from the inertial action to the non-inertial action and switches the inverter 11A to the non-inertial action (S1408). In the case of the non-inertial action, the calculator 320 need not switch the action of the inverter and therefore maintains the action as it is (S1409).

Figure 8:
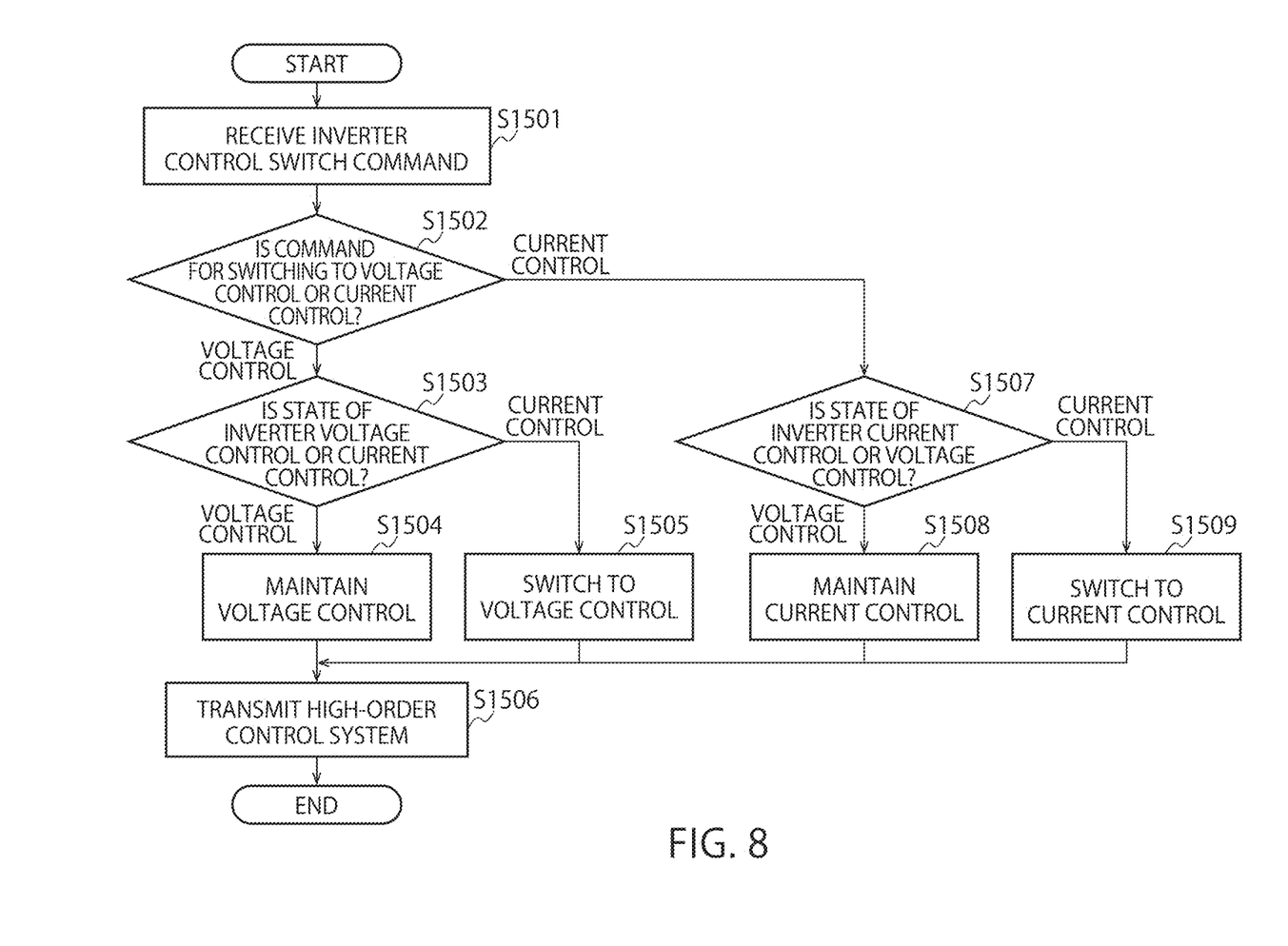
FIG. 8 is a flowchart schematically indicating an example of an action in which the inverter according to the embodiment switches its state on command from the high-order control system.

FIG. 8 is a flowchart schematically indicating an example of an action in which the inverter 11A according to the embodiment switches its state on command from the high-order control system.

First, the controller 300 receives an inverter control switch command for switching the state of the inverter 11A from the high-order control system (S1501). The calculator 320 of the controller 300 determines whether the inverter control switch command is a command for switching to the grid forming inverter or a command for switching to the grid following inverter (S1502). In the case of the grid forming inverter, the process flow moves to S1503, and in the case of the grid following inverter, the process flow moves to S1503.

Next, a case where the inverter control switch command for switching to the grid forming inverter has been received will be described. The calculator 320 of the inverter 11A determines whether the state of the inverter 11A is the grid forming inverter or the grid following inverter (S1503). In the case of the grid forming inverter, the process flow moves to S1504, and in the case of the grid following inverter, the process flow moves to S1505.

In the case of the grid forming inverter, the calculator 320 need not switch the state of the inverter and therefore maintains the state as it is (S1504). In the case of the grid following inverter, the calculator 320 rewrites the contents of the firmware in the storage 310 from the grid following inverter to the grid forming inverter and switches the inverter 11A to the grid forming inverter (S1505).

Next, the transmitter 330 transmits the state of the inverter 11A to the high-order control system (S1506).

Next, a case where the inverter control switch command for rewriting to the grid following inverter has been received will be described. The calculator 320 of the inverter 11A determines whether the state of the inverter 11A is the grid forming inverter or the grid following inverter (S1507). In the case of the grid following inverter, the process flow moves to S1508, and in the case of the grid forming inverter, the process flow moves to S1509.

In the case of the grid following inverter, the calculator 320 need not switch the state of the inverter and therefore maintains the state as it is (S1508).

In the case of the grid forming inverter, the calculator 320 rewrites the contents of the firmware in the storage 310 from the grid forming inverter to the grid following inverter and switches the inverter 11A to the grid following inverter (S1509).

Thus, according to the embodiment, the inverter 11A transmits information about mimicking of inertia to the high-order control system.

This allows the high-order control system, including the National Load Dispatch Center 201, to grasp the actual situation about an inertia given to the power system 11. Therefore, the high-order control system can stabilize the whole power system 11 by appropriately controlling the inverter 11A etc.

Modified Example 1

Figure 9:
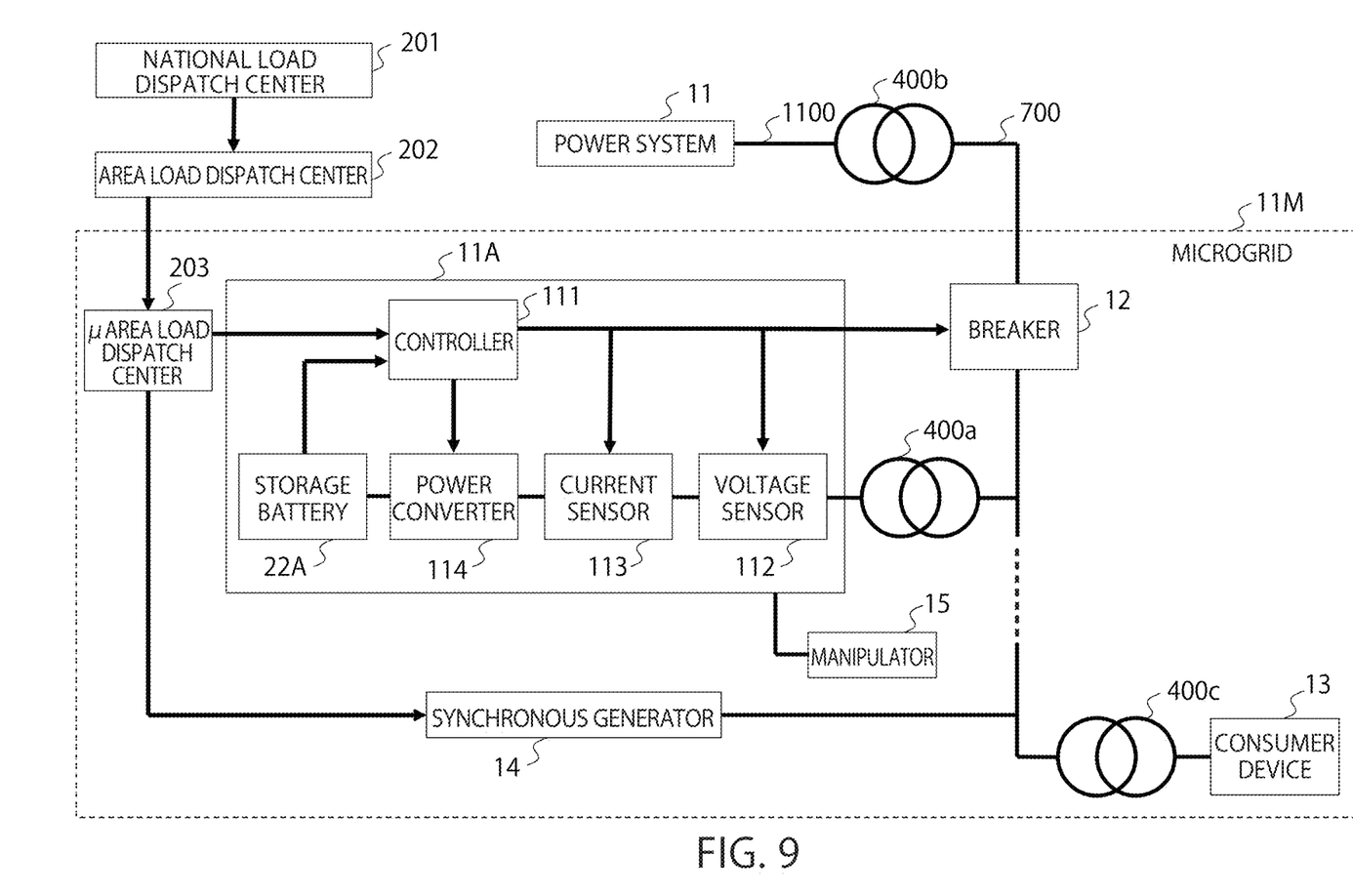
FIG. 9 is an overall configuration diagram of a modified example of the power supply system according to the embodiment.

FIG. 9 is an overall configuration diagram of a modified example of the power supply system 1000 according to the embodiment.

The inverter 11A includes a storage battery 22A that is a secondary battery that supplies electricity and is capable of charging and discharging.

The storage battery 22A charges and discharges as needed. For example, when power demand for the power system 11 is low and there is a power margin, the storage battery 22A stores electricity by being charged with electricity from the power system 11. When power demand for the power system 11 increases, the storage battery 22A discharges the stored electricity and supplies the electricity to the power system 11 through the power converter 114.

The amount of electricity stored in the storage battery 22A is limited. Even when the action of the power converter 114 is the inertial action, if the amount of electricity stored in the storage battery 22A is not larger than a specified electricity storage amount, the inverter 11A cannot provide a mimicked inertia to the power system 11.

The transmitter 330 transmits, to the high-order control system, information on the actual provision of an inertia different from the inertia information that is based on the action of the inverter 11A.

Thus, regardless of the action of the inverter 11A, the transmitter 330 transmits information indicating whether an inertia can be provided to the power system 11. Regardless of the operation of equipment, the inverter 11A can transmit information with priority given to whether it can actually provide an inertia to the power system 11.

The present invention is not limited to the above embodiment as it is but, in its implementation stage, can be embodied with changes made to the components within a range that does not depart from the gist of the invention. Further, various inventions can be created by appropriately combining a plurality of components disclosed in the above embodiment. For example, some components may be omitted from all the components indicated in the embodiment. In addition, components in different embodiments may be appropriately combined.

The invention claimed is:

1. An inverter comprising:
   a power converter configured to be able to perform at least one of a first action of generating electricity to be output to a power system based on a pseudo inertia and a second action of generating electricity to be output to the power system without being based on the pseudo inertia;
   a calculator configured to determine whether the power converter is performing which of the first action or the second action; and
   a transmitter configured to transmit, to a high-order control system which manages the power system, first information including a determination result of the calculator, the determination result indicating which of the first action and the second action the power converter is performing, wherein the high-order control system is configured to grasp actual situation about an inertia given to the power system based on the first information.

2. The inverter according to claim 1, wherein the inverter is a grid forming inverter that controls a voltage to be output to the power system or a grid following inverter that controls a current to be output to the power system.

3. The inverter according to claim 1, wherein the transmitter is configured to transmit the first information to the high-order control system in specified cycles.

4. The inverter according to claim 1, wherein the transmitter is configured to transmit the first information to the high-order control system based on a state transmission request from the high-order control system.

5. The inverter according to claim 1, comprising an authentication information transmitter configured to transmit authentication information to confirm whether the first information is true or false.

6. The inverter according to claim 1, comprising a storage configured to store information indicating the first action or the second action performed by the power converter, and is able to switch an action performed by the power converter by rewriting contents stored in the storage, and the calculator determines, based on the information in the storage, whether the power converter is performing which of the first action or the second action.

7. The inverter according to claim 6, wherein contents of the information stored in the storage can be rewritten based on an order input from a manipulator which is operatable by a user, and wherein the contents of the information stored in the storage is rewritten to the first action or the second action based on the order input from the manipulator.

8. The inverter according to claim 1, wherein the transmitter is configured to transmit second information indicating a state of the power converter.

9. The inverter according to claim 1, wherein the first information includes an inertia constant of the power converter, which is information for quantitatively grasping the inertia of the power converter.

10. The inverter according to claim 9, comprising a power storage configured to store electricity, wherein the transmitter is configured to transmit the inertia information different from the inertia information that is based on the inertia of the power converter, when an amount of electricity stored in the power storage is not larger than a specified electricity storage amount in a case where electricity discharged from the power storage is to be converted by the power converter through the first action.

11. The inverter according to claim 1, wherein the inverter is connected to a microgrid,
the microgrid comprises a breaker connecting or disconnecting between the microgrid and the power system, and
wherein when the breaker disconnects between the microgrid and the power system during a period in which the power converter is performing the first action, the transmitter is configured to transmit, to the high-order control system, information indicating that electricity based on the inertia is not being output to the power system based on the inertia.

12. The inverter according to claim 1, wherein the transmitter is configured to transmit the first information by wireless or wired communication.

13. The inverter according to claim 1, wherein the inverter receives a control command from the high-order control system based on the first information and operates the power converter based on the control command.

14. An energy control system that controls a microgrid including the inverter according to claim 1.

15. The energy control system according to claim 14, comprising a central command system configured to manage the microgrid.

16. The inverter according to claim 1, wherein the high-order control system stabilizes the power system by controlling the inverter based on the grasped situation.

17. The inverter according to claim 1, further comprising a control configured to determine whether to perform which of the first action or the second action based on an order input from a manipulator which is operatable by a user and control the power converter to perform the determined action of the first action or the second action.

18. A power source device comprising
an inverter comprising:
a power generator configured to convert renewable energy into electricity;
a power converter configured to be able to perform at least one of a first action of generating electricity to be output to a power system based on a pseudo inertia by converting electricity generated by the power generator, and a second action of generating electricity to be output to the power system without being based on the pseudo inertia by converting electricity generated by the power generator;
a calculator configured to determine whether the power converter is performing which of the first action or the second action; and
a transmitter configured to transmit, to a high-order control system which manages the power system, first information including a determination result of the calculator, the determination result indicating which of the first action and the second action the power converter is performing, wherein the high-order control system is configured to grasp actual situation about an inertia given to the power system based on the first information.

19. An energy control method comprising:
performing at least one of a first action of generating electricity to be output to a power system based on a pseudo inertia and a second action of generating electricity to be output to the power system without being based on the pseudo inertia;
determining whether the power converter is performing which of the first action or the second action; and
transmitting to a high-order control system which manages the power system, first information including a determination result, the determination result indicating which of the first action and the second action is being performed, wherein the high-order control system is configured to grasp actual situation about an inertia given to the power system based on the first information.

20. A non-transitory computer readable medium having a computer program stored therein which when executed by a computer, causes the computer to perform processes comprising:
performing at least one of a first action of generating electricity to be output to a power system based on a pseudo inertia and a second action of generating electricity to be output to the power system without being based on the pseudo inertia;
determining whether the power converter is performing which of the first action or the second action; and
transmitting, to a high-order control system which manages the power system, first information including a determination result, the determination result indicating which of the first action and the second action is being performed, wherein the high-order control system is configured to grasp actual situation about an inertia given to the power system based on the first information.

* * * * *